(12) United States Patent
Hailong et al.

(10) Patent No.: US 10,759,705 B2
(45) Date of Patent: *Sep. 1, 2020

(54) DIELECTRIC COMPOSITION AND ELECTRONIC COMPONENT

(71) Applicant: TDK CORPORATION, Tokyo (JP)

(72) Inventors: Liu Hailong, Xiamen (CN); Liang Liping, Xiamen (CN); Daisuke Ohtsu, Xiamen (CN)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/358,041

(22) Filed: Mar. 19, 2019

(65) Prior Publication Data

US 2019/0300437 A1 Oct. 3, 2019

(30) Foreign Application Priority Data

Mar. 30, 2018 (CN) .......................... 2018 1 0293042

(51) Int. Cl.
*C04B 35/468* (2006.01)
*C04B 35/47* (2006.01)
(Continued)

(52) U.S. Cl.
CPC ...... *C04B 35/4682* (2013.01); *C04B 35/6261* (2013.01); *C04B 35/62695* (2013.01);
(Continued)

(58) Field of Classification Search
CPC .......................... C04B 35/4682; H01G 4/1227
See application file for complete search history.

(56) References Cited

U.S. PATENT DOCUMENTS 6,248,254 B1 * 6/2001 Kimura ................. C04B 35/465
252/62.9 R
6,372,152 B1 * 4/2002 Sawada ................. C04B 35/475
252/62.9 R
(Continued)

FOREIGN PATENT DOCUMENTS

JP 2003-163132 A 6/2003

*Primary Examiner* — Karl E Group
(74) *Attorney, Agent, or Firm* — Oliff PLC

(57) ABSTRACT

A dielectric composition has barium, strontium, and bismuth calcium titanates constituting a main component and subcomponent. "a" mol % represents a content of barium titanate in terms of $BaTiO_3$, "b" mol % strontium titanate in terms of $SrTiO_3$, and "c" mol % bismuth calcium titanate in terms of $CaBi_4Ti_4O_{15}$ in the main component composition. a+b+c=100 is satisfied, 50≤a≤83, 12≤b≤49.5, 0.5≤c≤5. The dielectric composition includes a first subcomponent constituted by at least one compound including one of manganese, iron, and chromium. The first subcomponent is included in a ratio of 0.2 wt % or more and 3 wt % or less in terms of total of $MnCO_3$, $Fe_2O_3$, and $Cr_2O_3$ with respect to 100 wt % of the main component. The dielectric composition includes a second subcomponent compound including niobium, included in a ratio of 0.1 wt % or more and 3 wt % or less in terms of $Nb_2O_5$ with respect to 100 wt % of the main component.

6 Claims, 2 Drawing Sheets

(51) Int. Cl.
  *C04B 35/475*  (2006.01)
  *H01G 4/12*  (2006.01)
  *C04B 35/626*  (2006.01)
  *C04B 35/634*  (2006.01)
  *C04B 35/64*  (2006.01)
  *H01G 4/008*  (2006.01)

(52) U.S. Cl.
  CPC ........ *C04B 35/63416* (2013.01); *C04B 35/64* (2013.01); *H01G 4/008* (2013.01); *H01G 4/1227* (2013.01); *C04B 2235/3232* (2013.01); *C04B 2235/3236* (2013.01); *C04B 2235/3241* (2013.01); *C04B 2235/3272* (2013.01); *C04B 2235/3298* (2013.01); *C04B 2235/442* (2013.01); *C04B 2235/602* (2013.01); *C04B 2235/6567* (2013.01)

(56) References Cited

U.S. PATENT DOCUMENTS

| | | | | |
|---|---|---|---|---|
| 6,461,532 | B1* | 10/2002 | Oka | ............... C04B 35/475 |
| | | | | 252/62.9 R |
| 9,202,626 | B2* | 12/2015 | Suzuki | ............... H01G 4/1227 |
| 2019/0300435 | A1* | 10/2019 | Liping | ............... H01G 4/30 |
| 2019/0300436 | A1* | 10/2019 | Ohtsu | ............... C04B 35/4682 |
| 2019/0300437 | A1* | 10/2019 | Hailong | ............... C04B 35/4682 |

* cited by examiner

DIELECTRIC COMPOSITION AND ELECTRONIC COMPONENT

BACKGROUND OF THE INVENTION

The present invention relates to a dielectric composition and an electronic component.

In recent years, electronic devices have rapidly attained higher-performances, and along with that electronic circuits have rapidly become more compact and more complicated. Thus, electronic components are also demanded to become even more compact and to attain even higher performances. That is, the dielectric composition and the electronic component of which a good temperature property is maintained while attaining low loss of permittivity in order to maintain a capacitance even when made compact, further generating small amount of heat while driving, and having high DC breakdown voltage in order to be used under high voltage are demanded.

In order to correspond to the above demands, Patent Document 1 discloses $PbTiO_3$—$SrTiO_3$—$Bi_2Ti_3O_9$ based dielectric composition. However, the dielectric composition includes lead hence it was a problem from environmental point of view.

[Patent Document 1] JP Patent Laid Open No. 2003-163132

BRIEF SUMMARY OF THE INVENTION

The object of the present invention is to provide a dielectric composition having a high permittivity while attaining a good temperature property, further having low dielectric loss and heat generating property, and having a high DC breakdown voltage, even though lead is substantially not used; and also the object of the present invention is to provide an electronic component including the dielectric composition.

In order to attain the above object, the dielectric composition according to the present invention includes a dielectric composition having barium titanate, strontium titanate, and bismuth calcium titanate constituting a main component and a subcomponent, wherein when "a" mol % represents a content of barium titanate in terms of $BaTiO_3$, "b" mol % represents a content of strontium titanate in terms of $SrTiO_3$, and "c" mol % represents a content of bismuth calcium titanate in terms of $CaBi_4Ti_4O_{15}$ in a composition of the main component, and a+b+c=100 is satisfied, said "a", "b", and "c" are values within below ranges, $50 \leq a \leq 83$, $12 \leq b \leq 49.5$, $0.5 \leq c \leq 5$, the dielectric composition includes a first subcomponent constituted by at least one selected from the group consisting of a compound including manganese, a compound including iron, and a compound including chromium, and the first subcomponent is included in a ratio of 0.2 wt % or more and 3 wt % or less in terms of total of $MnCO_3$, $Fe_2O_3$, and $Cr_2O_3$ with respect to 100 wt % of the main component, and the dielectric composition includes a second subcomponent which is a compound including niobium, and the second subcomponent is included in a ratio of 0.1 wt % or more and 3 wt % or less in terms of $Nb_2O_5$ with respect to 100 wt % of the main component.

Also, more preferably, in the dielectric composition according to the present invention, said "a", "b", and "c" in the main element composition are within ranges of $65 \leq a \leq 78$, $17.5 \leq b \leq 34$, and $1.0 \leq c \leq 4.5$.

Further preferably, a weight ratio $Nb_2O_5/(MnCO_3+Fe_2O_3+Cr_2O_3)$ of the second subcomponent with respect to a total weight $(MnCO_3+Fe_2O_3+Cr_2O_3)$ of the first subcomponent is 0.3 or more and less than 2.

The dielectric composition according to the present invention has the above mentioned specific composition and content, thereby even though lead is substantially not used, high specific permittivity and DC breakdown voltage can be attained, and a dielectric loss can be made low at normal temperature, and good heat generating property and temperature property can be attained.

The electronic component according to the present invention includes the above mentioned dielectric composition. Further, the dielectric composition of the present invention has an excellent reduction resistance, thus Cu-electrode can be used as an electrode, and a cost can be reduced.

DETAILED DESCRIPTION OF THE INVENTION

Hereinafter, a specific embodiment of the present invention is described based on figures.

Figure 1:
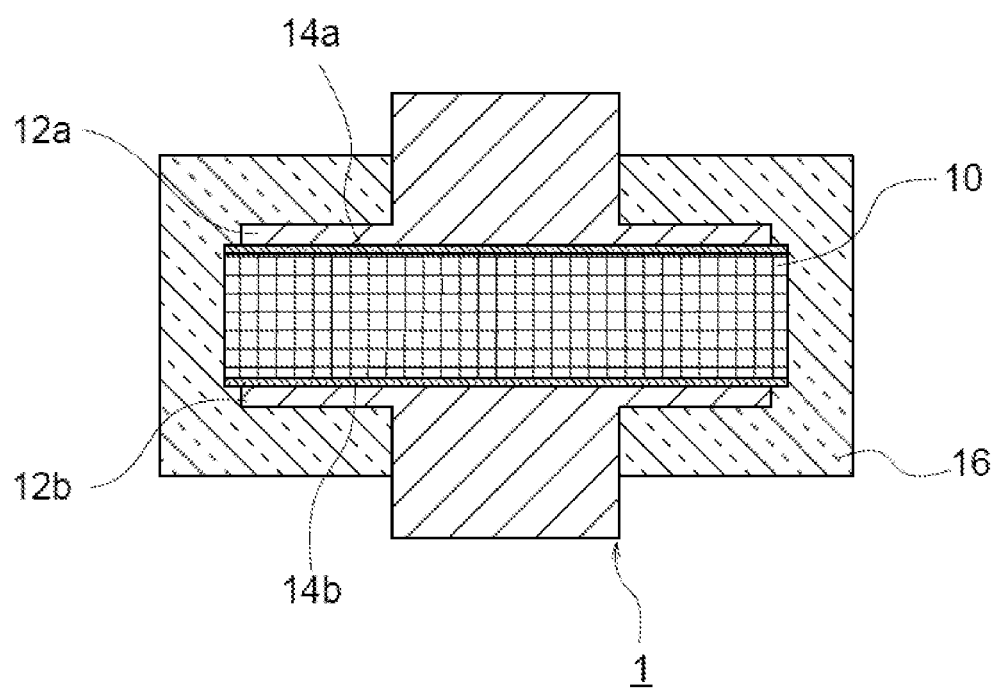
FIG. 1 is a cross section image of a single layer capacitor according to an embodiment of the present invention.

A type of the electronic component including the dielectric composition of the present embodiment is not particularly limited, and for example a single layer capacitor 1 shown in FIG. 1 may be mentioned.

The single layer capacitor 1 shown in FIG. 1 has a dielectric composition 10 according to the present embodiment. On both faces of the dielectric composition 10, terminals 12a and 12b are respectively adhered via electrodes 14a and 14b, and a synthetic resin 16 covers the entire surface thereof.

The dielectric composition according to the present embodiment includes barium titanate, strontium titanate, and bismuth calcium titanate which constitute a main component and each content is within a specific range. Also, at least one selected from the group consisting of a compound including manganese, a compound including iron, and a compound including chromium constituting a first subcomponent is included, and each content is within a specific range; and also a compound including niobium is included as a second subcomponent, and its content is within a specific range of content.

When "a" mol % represents a content of barium titanate in terms of $BaTiO_3$, "b" mol % represents a content of strontium titanate in terms of $SrTiO_3$, and "c" mol % represents a content of bismuth calcium titanate in terms of $CaBi_4Ti_4O_{15}$ in the main component, and a+b+c=100 is satisfied, the main component includes each component so that "a", "b", and "c" are values within following ranges of, $50 \leq a \leq 83$, $12 \leq b \leq 49.5$, and $0.5 \leq c \leq 5$.

Figure 2:
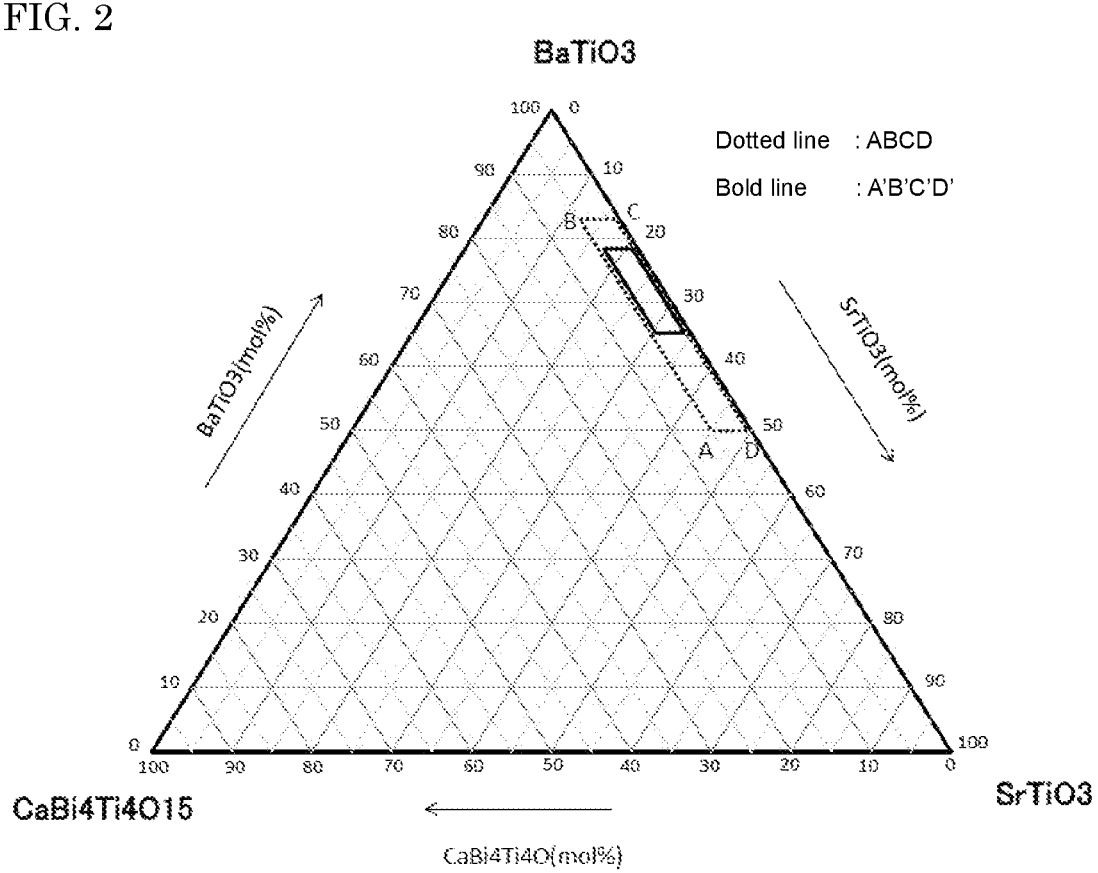
FIG. 2 is a ternary phase diagram of a composition of a main component according to the present embodiment.

When the ranges defined by said "a", "b", and "c" are shown in a ternary phase diagram, the ranges are within the following four points of point A, point B, point C, and point D.

point A: (a, b, c)=(50, 45, 5)

point B: (a, b, c)=(83, 12, 5)

point C: (a, b, c)=(83, 16.5, 0.5)
point D: (a, b, c)=(50, 49.5, 0.5)
Said "a", "b", and "c" in the main component are preferably within following ranges.
65≤a≤78
17.5≤b≤34
1.0≤c≤4.5
When the ranges defined by preferable "a", "b", and "c" are shown in a ternary phase diagram, the ranges are within the following four points of point A', point B', point C', and point D'.
point A': (a, b, c)=(65, 30.5, 4.5)
point B': (a, b, c)=(78, 17.5, 4.5)
point C': (a, b, c)=(78, 21, 1)
point D': (a, b, c)=(65, 34, 1)
FIG. 2 shows the ternary phase diagram showing position of each point mentioned in above.

In the dielectric composition according to the present embodiment, each composition of the main component is within the range surrounded by four points of point A, point B, point C, and point D. Thereby, even though lead is substantially not used, a good dielectric composition having a high specific permittivity of 1250 or more while having a good temperature property of +22% to −60% in −25° C. to 125° C., a high DC breakdown voltage of 11 kV/mm or more, a low dielectric loss of 3% or less, and further having a good heat generating property of which a heat generation (ΔT) when applying pressure of 90 kHz·250 V/mm is less than 15° C. can be obtained. When each composition of the main component is within the range surrounded by four points of point A', point B', point C', and point D', a balance of a specific permittivity, a temperature property, a heat generating property, and a dielectric loss as a whole tends to improve. When each composition of the main component is within the range surrounded by four points of point A', point B', point C', and point D', a good dielectric composition having a high specific permittivity of 1400 or more while having a good temperature property of +22% to −50% in −25° C. to 125° C., a high DC breakdown voltage of 11 kV/mm or more, having a low dielectric loss of 2.5% or less, and having a good heat generating property can be obtained.

On the other hand, when the content of barium titanate is less than 50 mol %, at least one of the specific permittivity, the heat generating property, and the temperature property may deteriorate in some cases. When the content of barium titanate is more than 83 mol %, at least one of the dielectric loss and the heat generating property may deteriorate.

Also, when the content of bismuth calcium titanate is less than 0.5 mol %, at least one of the temperature property, the dielectric loss, and the heat generating property may decrease, and if it exceeds 5 mol %, the specific permittivity may decrease.

Note that, in the dielectric composition according to the present embodiment, "not substantially using lead" specifically means that a content of lead is 0.001 wt % or less with respect to 100 wt % of the entire dielectric composition. In the dielectric composition according to the present embodiment, an environmental burden can be decreased by not substantially using lead.

The dielectric composition according to the present embodiment includes the first subcomponent constituted by at least one selected from the group consisting of a compound including manganese, a compound including iron, and a compound including chromium. By including the first subcomponent, the dielectric loss can be decreased, and also an insulation resistance and DC breakdown voltage can be increased.

The content of the first subcomponent is 0.2 wt % or more and 3 wt % or less in terms of total of $MnCo_3$, $Fe_2O_3$, and $Cr_2O_3$ with respect to 100 wt % of the entire main component, and more preferably it is 0.25 to 2.5 wt %, and more preferably 0.28 to 1.0 wt %. When the content of the first subcomponent is too much, the specific permittivity and the DC breakdown voltage may deteriorate in some cases.

The dielectric composition according to the present embodiment has the compound including niobium as the second subcomponent. By including the second subcomponent, the temperature property and the heat generating property can be improved, the dielectric loss can be reduced, and the DC breakdown voltage can be increased.

The content of the compound including niobium is 0.1 wt % or more and 3 wt % or less in terms of $Nb_2O_5$ with respect to 100 wt % of the entire main component, preferably it is 0.2 to 1.8 wt %, and more preferably it is 0.3 to 1.5 wt %. When the content of the second subcomponent is too much, at least one of the specific permittivity, the dielectric loss, the DC breakdown voltage may deteriorate, and the heat generating property in some cases.

In the dielectric composition according to the present embodiment, a weight ratio $Nb_2O_5/(MnCO_3+Fe_2O_3+Cr_2O_3)$ of the second subcomponent with respect to the total weight $(MnCO_3+Fe_2O_3+Cr_2O_3)$ of the first subcomponent is preferably 0.3 or more and less than 2, and more preferably it is 0.4 to 1.8. By setting the weight ratio of the second subcomponent with respect to the first subcomponent within the above mentioned range, the DC breakdown voltage can be further increased, the dielectric loss can be reduced, and a good temperature property can be obtained.

Hereinafter, a method of producing the dielectric composition and electronic component according to the present embodiment is described, however the method of producing the dielectric composition and electronic component is not limited thereto.

First, a raw material powder of the dielectric composition according to the present embodiment is prepared. As the raw material powder, a powder of a compound of each component or a compound which becomes each component by firing is prepared. Among the components, as for barium titanate ($BaTiO_3$) and strontium titanate ($SrTiO_3$), barium titanate powder and strontium titanate powder are preferably prepared when preparing the raw material.

Also, bismuth calcium titanate ($CaBi_4Ti_4O_{15}$) may be prepared in advance, or raw materials which generate bismuth calcium titanate during firing of dielectrics may be used. As the raw materials which generate bismuth calcium titanate, for example bismuth oxide, titanium oxide, and calcium carbonate may be mentioned, but the raw materials are not limited thereto. Bismuth calcium titanate prepared in advance is used because it can further improve the DC breakdown voltage and the temperature property, and also can further reduce the dielectric loss.

As the first subcomponent and the second subcomponent, other than oxides of each element, a compound which becomes oxides of each element after firing such as carbonates, nitrates, sulfates, and the like can be prepared.

Next, the raw material powder of each component is mixed, and the mixed powder is obtained. The method of mixing is not particularly limited, and usual method such as a dry mixing method, a wet mixing method, and the like can be used.

Next, the mixed powder is granulated, and after granulation it is sieved if necessary, thereby granules are obtained. A method of granulation is not particularly limited. For example, a method of granulating by adding the mixed powder into PVA (polyvinyl alcohol) aqueous solution may be mentioned. Also, a method of sieving is not particularly limited. For example, a coarse granulated powder may be removed by sieving.

Next, the granules are molded, and a molded body made of the dielectric composition is obtained. A method of molding is not particularly limited, and a usual method can be used. For example, a pressure molding can be used. Pressure applied during a pressure molding is not particularly limited. For example, it may be 200 to 600 MPa.

Next, by firing the obtained molded body, a sintered body made of the dielectric composition is obtained. A firing condition is not particularly limited. A firing temperature can be 1200 to 1350° C. A firing atmosphere is not particularly limited. For example, the atmosphere may be in air, in nitrogen atmosphere, in a reduced atmosphere using nitrogen and hydrogen, and it may be other atmosphere as well.

Further, a pair of electrodes is bonded to the obtained sintered body. The pair of electrodes may be bonded for example to opposing two faces of the obtained sintered body.

Also, a method of bonding the electrodes to the sintered body is not particularly limited. For example, an electrode paste may be coated to the obtained sintered body, then baked at 700 to 900° C., thereby the electrodes can be bonded to the obtained sintered body. As the electrode paste, for example Ag paste, Cu paste, and the like can be used.

The dielectric composition of the present invention attains excellent properties as mentioned in above even though lead is not used. Further, surprisingly, the dielectric composition of the present invention has an excellent reduction resistance. In general, barium titanate based dielectrics have a low reduction resistance, thus it was difficult to use Cu-electrode which was baked under reduced atmosphere. However, the dielectric composition of the present embodiment has a high reduction resistance, thus inexpensive Cu-electrode can be used, and the cost can be reduced.

Further, a terminal is connected via the electrodes. A method of connecting the terminal via the electrodes is not particularly limited. Further, a resin is coated to the entire surface of the dielectric composition but exposing part of the terminal. A coating method and a type of the resin for coating are not particularly limited.

The single layer capacitor as shown in FIG. 1 can be obtained as such. The single layer capacitor can be used under extremely high voltage by using the dielectric composition according to the present embodiment.

Note that, in the above, the single layer capacitor shown in FIG. 1 was used as the electronic component according to the present embodiment in order to explain the method of production, however the electronic component of the present invention is not limited to the single layer capacitor, and it may be other capacitors such as a multilayer capacitor and the like. A method of producing the multilayer capacitor and the like is not particularly limited, and known method of production can be used. Also, use of the electronic component of the present invention is not particularly limited, and the present invention can be suitably used as a high frequency capacitor and a high voltage capacitor.

EXAMPLES

Hereinafter, the present invention will be described in further detail based on examples, but the present invention is not to be limited thereto.

Examples and Comparative Examples

As raw material powders, barium titanate powder, strontium titanate powder, bismuth calcium titanate powder, bismuth oxide powder, titanium oxide powder, calcium carbonate powder, and powders which become the first subcomponent and second subcomponent by firing were prepared. Then, these were weighed so that the composition of Examples and Comparative examples shown in Table 1 can be obtained at the end. Note that, in Table 1, BT represents barium titanate ($BaTiO_3$), ST represents strontium titanate ($SrTiO_3$), and CBT represents bismuth calcium titanate ($CaBi_4Ti_4O_{15}$). Also, in Table 1, "Nb/(Mn+Cr+Fe)" represents the weight ratio $Nb_2O_5/(MnCO_3+Fe_2O_3+Cr_2O_3)$ of the second subcomponent with respect to the total weight ($MnCO_3+Fe_2O_3+Cr_2O_3$) of the first subcomponent. Also, in Sample No. 1b, calcium carbonate powder, bismuth oxide powder, and titanium oxide powder were used instead of bismuth calcium titanate powder. Calcium carbonate powder, bismuth oxide powder, and titanium oxide powder were used so that $CaCO_3$, $Bi_2O_3$, and $TiO_2$ were 1:2:4 in molar ratio.

In Table 1, when the composition constituting the main component is within the range surrounded by four points of point A, point B, point C, and point D, it is indicated "in" at column "ABCD"; and when the composition constituting the main component is out of the range surrounded by four points of point A, point B, point C, and point D, it is indicated "out" at column "ABCD". Further, when the composition constituting the main component is within the range surrounded by four points of point A', point B', point C', and point D', it is indicated "in" at column "A'B'C'D'"; and when the composition constituting the main component is out of the range surrounded by four points of point A', point B', point C', and point D', it is indicated "out" at column "A'B'C'D'".

Note that, each point is as follows.
point A: (a, b, c)=(50, 45, 5)
point B: (a, b, c)=(83, 12, 5)
point C: (a, b, c)=(83, 16.5, 0.5)
point D: (a, b, c)=(50, 49.5, 0.5)
point A': (a, b, c)=(65, 30.5, 4.5)
point B': (a, b, c)=(78, 17.5, 4.5)
point C': (a, b, c)=(78, 21, 1)
point D': (a, b, c)=(65, 34, 1)

In above, "a" represents the content of barium titanate (mol %), "b" represents the content of strontium titanate (mol %), and "c" represents the content of bismuth calcium titanate (mol %).

After mixing each raw material powder, fine pulverization was carried out so that the average particle size was 0.5 to 3 μm or so using a pot mill. After dehydrating and drying the fine pulverized powder, polyvinyl alcohol was added as an organic binder, and granulation and sieving were carried out, thereby granules were obtained.

The granules were molded by applying a pressure of 300 MPa, thereby a molded body of a circular disk shape having a diameter of 16.5 mm, a thickness of 0.65 mm was obtained.

The molded body was fired in air for 4 hours at 1200 to 1300° C., thereby a ceramic element of a circular disk shape was obtained. The composition of the obtained ceramic element was subjected to a photo luminescence X ray analysis to verify the composition shown in Table 1 was obtained in terms of certain oxides and carbonates. Next, Cu electrode paste was coated to both faces of the ceramic element, and baked in reduced atmosphere, thereby the capacitor sample was obtained. A number of capacitor samples necessary for carrying out all of the evaluations shown in below were produced.

Further, the obtained capacitor samples were evaluated for a specific permittivity, a dielectric loss, an insulation resistance, a heat generating property, DC breakdown voltage, and a capacitance temperature property. Hereinafter, a method of evaluation is described.

(Specific Permittivity (εs))

A capacitance of a circular disk shape capacitor sample was measured using an LCR meter under the condition of a temperature of 25° C., a frequency of 1 kHz, an input signal level (measuring voltage) of 1.0 Vrms, thereby a specific permittivity (εs) was calculated from the capacitance. In the present example, εs≥1250 was considered good, and εs≥1400 was considered even better.

(Dielectric Loss)

The dielectric loss (tan δ) at a standard temperature of 25° C. of a capacitor sample was measured under the condition of a frequency of 1 kHz, an input signal level (measuring voltage) of 1.0 Vrms using a LCR meter. In the present example, when the dielectric loss (tan δ) at a frequency of 1 kHz was 3% or less, it was considered good.

(Insulation Resistance (IR))

Using an insulation resistance meter (R8340A by Advantest) to a capacitor sample, DC voltage of 500 V was applied at 20° C. for 10 seconds and left for 50 seconds, then the insulation resistance IR after the voltage application was measured. In the present example, $1.0 \times 10^6 \Omega$ or more was considered good.

(Heat Generating Property)

A sample was made of which the diameter of the ceramic element was changed so that the sample after Cu-electrode being baked showed 1000 pF, then a lead wire was installed and an insulation resin was coated. A temperature where the temperature of the ceramic element after coating the insulation resin applied with AC90 kHz250 V (250V/mm per 1 mm) was stabilized was measured. The temperature difference (ΔT) between the element temperature and the atmosphere temperature was obtained. The smaller the ΔT is, the lower the heat generating property is. In the present examples, ΔT of 15° C. or narrower was considered good.

(DC Breakdown Voltage)

A measurement of DC breakdown voltage (DC-Eb, kV/mm) was carried out by following method. Both ends of a capacitor sample obtained were applied with DC electric field. The DC electric field was increased at a speed of 100 V/s, and a change in a leak current was observed. An electric field when the leak current was 100 mA was divided by the thickness of the capacitor sample, thereby the DC breakdown voltage (DC-Eb) per unit thickness was obtained. The higher the DC-Eb is, the higher the DC breakdown voltage is, hence it can be considered that a voltage resistance against the DC voltage is excellent. In the present example, DC-Eb≥11 kV/mm was considered good.

(Temperature Property)

A method of measuring the temperature property TC (%) is as described in below. First, temperature was changed within the range of −25° C. to +125° C., and the capacitance at each temperature was measured. The capacitance was measured under the condition of a frequency of 1 kHz, an input signal level of 1.0 Vrms. Then, when the capacitance at the standard temperature of +25° C. was $C_{25}$ and the capacitance at T(° C.) was $C_T$, TC at each temperature was measured according to below equation.

$$TC\ (\%)=\{(C_T-C_{25})/C_{25}\}\times 10^2$$

In the present example, when TC constantly satisfied −60≤TC≤+22 within the range of −25° C. to +125° C., it was considered good. In the present example, when TC was within the above mentioned range at −25° C. and +125° C., then TC was within the above mentioned range at other temperatures in the range of −25° C. to +125° C. Thus, in Table 1, TC at −25° C. and +125° C. are shown. Note that, even if TC did not constantly satisfied −60≤TC≤+22 within the range of −25° C. to +125° C., the above mentioned object of the present invention can be attained.

TABLE 1

| Sample No. | Main component (mol %) | | | | | | First subcomponent (wt %) | | | Second subcomponent (wt %) |
|---|---|---|---|---|---|---|---|---|---|---|
| | BT | ST | CBT | Bi₂O₃ | TiO₂ | CaCO₃ | MnCO₃ | Cr₂O₃ | Fe₂O₃ | Nb₂O₅ |
| 1a | 72.0 | 25.0 | 3.0 | — | — | — | 0.30 | — | — | 0.50 |
| 1b | 72.0 | 25.0 | — | 6.0 | 12.0 | 3.0 | 0.30 | — | — | 0.50 |
| 2(point A) | 50.0 | 45.0 | 5.0 | — | — | — | 0.30 | — | — | 0.50 |
| 3(point B) | 83.0 | 12.0 | 5.0 | — | — | — | 0.30 | — | — | 0.50 |
| 4(point C) | 83.0 | 16.5 | 0.5 | — | — | — | 0.30 | — | — | 0.50 |
| 5(point D) | 50.0 | 49.5 | 0.5 | — | — | — | 0.30 | — | — | 0.50 |
| 6(point A') | 65.0 | 30.5 | 4.5 | — | — | — | 0.30 | — | — | 0.50 |
| 7(point B') | 78.0 | 17.5 | 4.5 | — | — | — | 0.30 | — | — | 0.50 |
| 8(point C') | 78.0 | 21.0 | 1.0 | — | — | — | 0.30 | — | — | 0.50 |
| 9(point D') | 65.0 | 34.0 | 1.0 | — | — | — | 0.30 | — | — | 0.50 |
| 10* | 49.9 | 49.6 | 0.5 | — | — | — | 0.30 | — | — | 0.50 |
| 11* | 50.0 | 49.6 | 0.4 | — | — | — | 0.30 | — | — | 0.50 |
| 12* | 49.9 | 45.1 | 5.0 | — | — | — | 0.30 | — | — | 0.50 |
| 13* | 50.0 | 44.9 | 5.1 | — | — | — | 0.30 | — | — | 0.50 |
| 14* | 83.1 | 16.4 | 0.5 | — | — | — | 0.30 | — | — | 0.50 |
| 15* | 83.0 | 16.6 | 0.4 | — | — | — | 0.30 | — | — | 0.50 |
| 16* | 83.1 | 11.9 | 5.0 | — | — | — | 0.30 | — | — | 0.50 |
| 17* | 83.0 | 11.9 | 5.1 | — | — | — | 0.30 | — | — | 0.50 |
| 18* | 72.0 | 25.5 | 3.0 | — | — | — | — | — | — | 0.50 |
| 19 | 72.0 | 25.0 | 3.0 | — | — | — | 0.20 | — | — | 0.50 |
| 20 | 72.0 | 25.0 | 3.0 | — | — | — | 2.00 | — | — | 0.50 |

TABLE 1-continued

| 21 | 72.0 | 25.0 | 3.0 | — | — | — | 3.00 | — | — | 0.50 |
| 22* | 72.0 | 25.0 | 3.0 | — | — | — | 3.50 | — | — | 0.50 |
| 23 | 72.0 | 25.0 | 3.0 | — | — | — | — | 0.30 | — | 0.50 |
| 24 | 72.0 | 25.0 | 3.0 | — | — | — | — | — | 0.30 | 0.50 |
| 25 | 72.0 | 25.0 | 3.0 | — | — | — | 0.10 | 0.10 | 0.10 | 0.50 |
| 26* | 72.0 | 25.0 | 3.0 | — | — | — | 0.30 | — | — | — |
| 27* | 72.0 | 25.0 | 3.0 | — | — | — | 0.30 | — | — | 0.09 |
| 28 | 72.0 | 25.0 | 3.0 | — | — | — | 0.30 | — | — | 0.10 |
| 29 | 72.0 | 25.0 | 3.0 | — | — | — | 0.30 | — | — | 3.00 |
| 30* | 72.0 | 25.0 | 3.0 | — | — | — | 0.30 | — | — | 3.50 |
| 31 | 72.0 | 25.0 | 3.0 | — | — | — | 0.50 | — | — | 0.15 |
| 32 | 72.0 | 25.0 | 3.0 | — | — | — | 0.50 | — | — | 0.90 |
| 33 | 72.0 | 25.0 | 3.0 | — | — | — | 0.50 | — | — | 1.00 |
| 34* | 72.0 | 25.0 | 3.0 | — | — | — | — | — | — | — |

| Sample No. | Nb/(Mn + Cr + Fe) | ABCD | A'B'C'D' | $\varepsilon\,s$ 1 kHz | tan δ | IR (MΩ) | Heat generating property ($\Delta T$) (°C.) | DC-Eb (kV) | TC (%) −25° C. | TC (%) 125° C. |
|---|---|---|---|---|---|---|---|---|---|---|
| 1a | 1.67 | in | in | 1861 | 0.23% | 1E+07 | 8 | 18.9 | 11 | −31 |
| 1b | 1.67 | in | in | 2054 | 0.49% | 1E+07 | 10 | 14.9 | 15 | −39 |
| 2(point A) | 1.67 | in | out | 1252 | 0.17% | 1E+07 | 9 | 14.5 | 10 | −23 |
| 3(point B) | 1.67 | in | out | 1569 | 0.26% | 1E+07 | 14 | 14.5 | −3 | −14 |
| 4(point C) | 1.67 | in | out | 2560 | 0.25% | 1E+07 | 14 | 12.3 | 18 | −44 |
| 5(point D) | 1.67 | in | out | 2113 | 0.17% | 1E+07 | 11 | 13.4 | 30 | −54 |
| 6(point A') | 1.67 | in | in | 1435 | 0.21% | 1E+07 | 8 | 17.6 | 7 | −23 |
| 7(point B') | 1.67 | in | in | 1612 | 0.25% | 1E+07 | 7 | 18.0 | 1 | −19 |
| 8(point C') | 1.67 | in | in | 2382 | 0.24% | 1E+07 | 11 | 15.0 | 18 | −44 |
| 9(point D') | 1.67 | in | in | 2206 | 0.21% | 1E+07 | 11 | 15.1 | 22 | −49 |
| 10* | 1.67 | out | out | 2112 | 0.20% | 1E+07 | 14 | 12.1 | 31 | −61 |
| 11* | 1.67 | out | out | 2135 | 0.19% | 1E+07 | 15 | 11.8 | 32 | −61 |
| 12* | 1.67 | out | out | 1121 | 0.18% | 1E+07 | 7 | 17.3 | 10 | −23 |
| 13* | 1.67 | out | out | 1100 | 0.17% | 1E+07 | 8 | 17.6 | 10 | −23 |
| 14* | 1.67 | out | out | 2562 | 0.25% | 1E+07 | 14 | 13.8 | 18 | −61 |
| 15* | 1.67 | out | out | 2582 | 0.25% | 1E+07 | 15 | 12.4 | 18 | −62 |
| 16* | 1.67 | out | out | 1249 | 0.26% | 1E+07 | 7 | 18.8 | −3 | −14 |
| 17* | 1.67 | out | out | 1238 | 0.25% | 1E+07 | 7 | 19.0 | −3 | −13 |
| 18* | ∞ | in | in | 2896 | 5.64% | <10 | 19 | 2.1 | 19 | −29 |
| 19 | 2.50 | in | in | 1880 | 0.80% | 1E+06 | 12 | 12.5 | 16 | −28 |
| 20 | 0.25 | in | in | 1554 | 0.43% | 1E+07 | 12 | 13.9 | 11 | −16 |
| 21 | 0.17 | in | in | 1499 | 0.34% | 1E+07 | 11 | 11.2 | −15 | −9 |
| 22* | 0.14 | in | in | 1233 | 0.32% | 1E+07 | 11 | 9.9 | −30 | −6 |
| 23 | 1.67 | in | in | 1792 | 0.25% | 1E+07 | 10 | 15.6 | 20 | −33 |
| 24 | 1.67 | in | in | 1783 | 0.27% | 1E+07 | 10 | 15.9 | 20 | −34 |
| 25 | 1.67 | in | in | 1730 | 0.24% | 1E+07 | 10 | 15.9 | 20 | −34 |
| 26* | 0.00 | in | in | 1861 | 1.78% | 4E+06 | 18 | 10.2 | 11 | −31 |
| 27* | 0.30 | in | in | 1799 | 0.65% | 9E+06 | 15 | 12.9 | 6 | −27 |
| 28 | 0.33 | in | in | 1797 | 0.54% | 1E+07 | 9 | 13.5 | 6 | −27 |
| 29 | 10.00 | in | in | 1401 | 0.23% | 1E+07 | 11 | 13.2 | 21 | −26 |
| 30* | 11.67 | in | in | 1249 | 2.65% | 1E+06 | 15 | 11.8 | 26 | −25 |
| 31 | 0.30 | in | in | 1680 | 0.19% | 1E+07 | 8 | 17.5 | 10 | −29 |
| 32 | 1.80 | in | in | 1561 | 0.12% | 1E+07 | 7 | 18.2 | 9 | −27 |
| 33 | 2.00 | in | in | 1545 | 0.18% | 8E+06 | 9 | 18.9 | 9 | −25 |
| 34* | — | in | in | 2804 | 4.54% | <10 | 15 | 2.4 | 18 | −28 |

In Table 1, "*" indicates the comparative examples. According to Table 1, even though lead is not used, the examples having the composition within the range of the present invention, that is the dielectric composition having the main component composition within the range surrounded by ABCD and the predetermined first and second components, can attain a high specific permittivity of 1250 or higher while the temperature property being +22% to −60% in −25° C. to +125° C., a high DC breakdown voltage of 11 kV/mm or more, the dielectric loss of 3% or less a, and exhibited good heat generating property as heat generated (ΔT) when applied with 90 kHz·500V/mm was less than 15° C.

Also, when the main component composition is surround by A'B'C'D', each property and the balance between them further improved, it is possible to obtain the dielectric composition capable of attaining high specific permittivity of 1400 or higher while the temperature property was +22% to −50% in −25° C. to +125° C., a high DC breakdown voltage of 11 kV/mm or more was attained, the dielectric loss was 2.5% or less which was small, and a good heat generating property.

Further surprisingly, the dielectric composition of the present invention has excellent reduction resistance. In general, barium titanate based dielectrics has a low reduction resistance, thus it was difficult to use Cu-electrode which was baked under reduced atmosphere. However, the dielectric composition of the present invention has a high reduction resistance, thus inexpensive Cu-electrode can be used, and the cost can be reduced.

DESCRIPTION OF THE REFERENCE NUMERAL

1 ... Single layer capacitor
10 ... Dielectric composition
12a, 12b ... Terminal
14a, 14b ... Electrode
16 ... Synthetic resin

What is claimed is:

1. A dielectric composition comprising barium titanate, strontium titanate, and bismuth calcium titanate constituting a main component and a subcomponent, wherein
when "a" mol % represents a content of barium titanate in terms of $BaTiO_3$, "b" mol % represents a content of strontium titanate in terms of $SrTiO_3$, and "c" mol % represents a content of bismuth calcium titanate in terms of $CaBi_4Ti_4O_{15}$ in a composition of the main component, and a+b+c=100 is satisfied,
said "a", "b", and "c" are values within below ranges,
$50 \leq a \leq 83$,
$12 \leq b \leq 49.5$,
$0.5 \leq c \leq 5$,
the dielectric composition includes a first subcomponent constituted by at least one selected from the group consisting of a compound including manganese, a compound including iron, and a compound including chromium, and the first subcomponent is included in a ratio of 0.2 wt % or more and 3 wt % or less in terms of total of $MnCO_3$, $Fe_2O_3$, and $Cr_2O_3$ with respect to 100 wt % of the main component, and
the dielectric composition includes a second subcomponent which is a compound including niobium, and the second subcomponent is included in a ratio of 0.1 wt % or more and 3 wt % or less in terms of $Nb_2O_5$ with respect to 100 wt % of the main component.

2. The dielectric composition according to claim 1, wherein said "a", "b", and "c" in the main element composition are within ranges of
$65 \leq a \leq 78$,
$17.5 \leq b \leq 34$, and
$1.0 \leq c \leq 4.5$.

3. The dielectric composition according to claim 1, wherein a weight ratio of the second subcomponent with respect to a total weight of the first subcomponent is 0.3 or more and less than 2.

4. The dielectric composition according to claim 2, wherein a weight ratio of the second subcomponent with respect to a total weight of the first subcomponent is 0.3 or more and less than 2.

5. An electronic component including the dielectric composition according to claim 1.

6. The electronic component according to claim 5 comprising a Cu-electrode as an electrode.

* * * * *